(12) United States Patent
Ding et al.

(10) Patent No.: US 12,347,438 B2
(45) Date of Patent: Jul. 1, 2025

(54) OPTIMIZING PERSONAL VAD FOR ON-DEVICE SPEECH RECOGNITION

(71) Applicant: Google LLC, Mountain View, CA (US)

(72) Inventors: Shaojin Ding, Mountain View, CA (US); Rajeev Rikhye, Mountain View, CA (US); Qiao Liang, Mountain View, CA (US); Yanzhang He, Palo Alto, CA (US); Quan Wang, Hoboken, NJ (US); Arun Narayanan, Santa Clara, CA (US); Tom O'malley, Mountain View, CA (US); Ian Mcgraw, Mountain View, CA (US)

(73) Assignee: Google LLC, Mountain View, CA (US)

( * ) Notice: Subject to any disclaimer, the term of this patent is extended or adjusted under 35 U.S.C. 154(b) by 301 days.

(21) Appl. No.: 18/123,060

(22) Filed: Mar. 17, 2023

(65) Prior Publication Data
US 2023/0298591 A1    Sep. 21, 2023

Related U.S. Application Data

(60) Provisional application No. 63/269,618, filed on Mar. 19, 2022.

(51) Int. Cl.
*G10L 17/06*    (2013.01)
*G10L 17/22*    (2013.01)
(52) U.S. Cl.
CPC .............. *G10L 17/06* (2013.01); *G10L 17/22* (2013.01)

(58) Field of Classification Search
CPC .......... G10L 17/06; G10L 17/22; G10L 17/18; G10L 25/30; G10L 25/78
See application file for complete search history.

(56) References Cited

U.S. PATENT DOCUMENTS

| | | | |
|---|---|---|---|
| 11,605,388 B1 * | 3/2023 | Gupta | A63F 13/424 |
| 2019/0251952 A1 * | 8/2019 | Arik | G10L 13/08 |
| 2020/0380952 A1 * | 12/2020 | Zhang | G10L 13/08 |

OTHER PUBLICATIONS

International Search Report and Written Opinion for the related Application No. PCT/US2023/015551 dated Jun. 5, 2023, 65 pages.

(Continued)

*Primary Examiner* — Huyen X Vo
(74) *Attorney, Agent, or Firm* — Honigman LLP; Brett A. Krueger; Grant Griffith

(57) ABSTRACT

A computer-implemented method includes receiving a sequence of acoustic frames corresponding to an utterance and generating a reference speaker embedding for the utterance. The method also includes receiving a target speaker embedding for a target speaker and generating feature-wise linear modulation (FiLM) parameters including a scaling vector and a shifting vector based on the target speaker embedding. The method also includes generating an affine transformation output that scales and shifts the reference speaker embedding based on the FiLM parameters. The method also includes generating a classification output indicating whether the utterance was spoken by the target speaker based on the affine transformation output.

20 Claims, 8 Drawing Sheets

(56) References Cited

OTHER PUBLICATIONS

Shaojin Ding et al: "Personal VAD 2.0 Optimizing Personal Voice Activity Detection for On-Device Speech Recognition", arxiv.org, Cornell University • Library, 201 Olin Library Cornell University Ithaca, NY 14853, Jun. 25, 2022 (Jun. 25, 2022), XP091250866, p. 1, section 1-p. 3, section 2.5; figures 1, 2; 5 pages.

Shaojin Ding et al: "Personal VAD: Speaker-Conditioned Voice Activity Detection", arxiv.org, Cornell University Library, 201 Olin Library Cornell University Ithaca, NY 14853, Aug. 12, 2019 (Aug. 12, 2019), XP081638615, p. 1, section 1-p. 3, section 2.3; figures 1, 2 p. 4, section 3.3; 7 pages.

Ivan Medennikov et al: "Target-Speaker Voice Activity Detection: a Novel Approach for Multi-Speaker Diarization in a Dinner Party Scenario", arxiv.org, Cornell University Library, 201 Olin Library Cornell University Ithaca, NY 14853, Jul. 27, 2020 (Jul. 27, 2020), XP081711185, pp. 1-2, section 1 p. 2, section 3-p. 4, section 4—figures 1, 2; 5 pages.

Naoki Makishima et al: "Enrollment-less training for personalized voice activity detection", arxiv.org, Cornell University Library, 201 Olin Library Cornell University Ithaca, NY 14853, Jun. 23, 2021 (Jun. 23, 2021), XP081993656, p. 1, section 1-p. 2, section 3-p. 3, section 3.3—figure 1; 5 pages.

Maeng Joon Gyo et al: "Personality Enhancement for Speaker-dependent Voice Activity Detection", 2021 International Conference on Information and Communication Technology Convergence (ICTC), IEEE, Oct. 20, 2021 (Oct. 20, 2021), pp. 535-538, XP034038684, DOI: 10.1109/ICTC52510.2021.9621038 [retrieved on Nov. 18, 2021] p. 535, section I-p. 536, section II C; figure 1; 4 pages.

O'Malley Tom et al: "A Conformer-Based ASR Frontend for Joint Acoustic Echo Cancellation, Speech Enhancement and Speech Separation", 2021 IEEE Automatic Speech Recognition and Understanding Workshop (ASRU), IEEE, Dec. 13, 2021 (Dec. 13, 2021), pp. 304-311, XP034076936, DOI: 10.1109/ASRU51503.2021. 9687942 [retrieved on Jan. 20, 2022] p. 304, section 1-p. 307, section 2.5; figures 1, 2; 8 pages.

Ethan Perez et al: "FiLM: Visual Reasoning with a General Conditioning Layer", Arxiv.Org, Cornell University Library, 201 Olin Library Cornell University Ithaca, NY 14853, Sep. 22, 2017 (Sep. 22, 2017), XP080822826, p. 2, section 2-p. 3, section 2.2; figures 2, 3; 13 pages.

\* cited by examiner

OPTIMIZING PERSONAL VAD FOR ON-DEVICE SPEECH RECOGNITION

CROSS REFERENCE TO RELATED APPLICATIONS

This U.S. Patent application claims priority under 35 U.S.C. § 119(e) to U.S. Provisional Application 63/269,618, filed on Mar. 19, 2022. The disclosure of this prior application is considered part of the disclosure of this application and is hereby incorporated by reference in its entirety.

TECHNICAL FIELD

This disclosure relates to optimizing a personal voice activity detector for on-device speech recognition.

BACKGROUND

Speech-enabled devices have increased in popularity over the past several years. One challenge for speech-enabled devices is the ability to discern between background noise from the surrounding environment and speech directed towards the device. In some instances, speech-enabled devices further determine whether speech directed towards the device was spoken by a particular user or another user. This ability allows the device to decide whether to further process the audio (e.g., to process a command or query) or simply to ignore the received audio. The ability for the device to discern between the background noise and speech spoken by a particular user becomes even more difficult when considering latency and computational constraints of certain speech enabled devices in a production environment.

SUMMARY

One aspect of the disclosure provides a personal voice activity detector (VAD). The personal VAD includes a stack of multi-headed self-attention blocks configured to receive, as input, a sequence of acoustic frames corresponding to an utterance and generate, as output, a reference speaker embedding for the utterance. The personal VAD also includes a feature-wise linear modulation (FiLM) generator configured to receive, as input, a target speaker embedding for a target speaker and generate, as output, FiLM parameters that include a scaling vector and a shifting vector based on the target speaker embedding. The personal VAD also includes a FiLM layer configured to receive, as input, the reference speaker embedding and the FiLM parameters and generate, as output, an affine transformation output that scales and shifts the reference speaker embedding based on the FiLM parameters. The personal VAD also includes a classifier configured to generate a classification output indicating whether the utterance was spoken by the target speaker based on the affine transformation output.

Implementations of the disclosure may include one or more of the following optional features. In some implementations, the classification includes at least one of a target speaker token, a non-target speaker token, or a non-speech token. In some examples, the personal VAD further includes a speaker pre-net configured to receive the sequence of acoustic frames as input and generate, as output, a speaker information embedding extracted from the sequence of acoustic frames. In these examples, the FiLM generator may be further configured to receive, as input, a cosine similarity between the target speaker embedding and the speaker information embedding and generate, as output, the FiLM parameters that include the scaling vector and the shifting vector based on the cosine similarity. Here, the speaker pre-net includes a stack of multi-headed self-attention layers that include one or more Conformer layers.

The stack of multi-headed self-attention blocks may include one or more Conformer layers. In some implementations, the classifier includes a fully-connected layer. The personal VAD may operate in a streaming fashion. In some examples, the personal VAD further includes a pre-trained text-independent speaker recognition model configured to receive enrollment utterances spoken by the target speaker as input and generate, as output, the target speaker embedding for the target speaker based on the enrollment utterances. In some implementations, the personal VAD is trained on training data that includes an enrollment training utterance paired with the target speaker embedding and a non-enrollment training utterance not paired with any corresponding target speaker embedding.

Another aspect of the disclosure provides a computer-implemented method that when executed on data processing hardware causes the data processing hardware to perform operations for optimizing personal voice activity detection. The operations include receiving, as input to a personal voice activity detector (VAD), a sequence of acoustic frames corresponding to an utterance. The operations also include generating, using a stack of multi-headed self-attention blocks of the personal VAD, a reference speaker embedding for the utterance. The operations also include receiving a target speaker embedding for a target speaker embedding as input to a feature-wise linear modulation (FiLM) generator of the personal VAD and generating, using the FiLM generator, FiLM parameters that include a scaling vector and a shifting vector based on the target speaker embedding. The operations also include generating, using a FiLM layer of the personal VAD, an affine transformation output that scales and shifts the reference speaker embedding based on the FiLM parameters. The operations also include generating, using a classifier of the personal VAD, a classification output indicating whether the utterance was spoken by the target speaker based on the affine transformation output.

Implementations of the disclosure may include one or more of the following optional features. In some implementations, the classification output includes at least one of a target speaker token, a non-target speaker token, or a non-speech token. In some examples, the operations further include generating, using a speaker pre-net of the personal VAD, a speaker information embedding extracted from the sequence of acoustic frames. In these examples, the operations may further include generating, using the FiLM generator, the FiLM parameters based on a cosine similarity between the target speaker embedding and the speaker information embedding. Here, the speaker pre-net includes a stack of multi-headed self-attention layers including one or more Conformer layers.

The stack of multi-headed self-attention blocks may include one or more Conformer layers. In some implementations, the classifier includes a fully-connected layer. The personal VAD may operate in a streaming fashion. In some examples, the operations further include receiving, as input to a pre-trained text-independent speaker recognition model, enrollment utterances spoken by the target speaker and generating, using the pre-trained text-independent speaker recognition model, the target speaker embedding for the target speaker based on the enrollment utterances. The personal VAD may be trained on training data that includes an enrollment training utterance paired with the target speaker embedding and a non-enrollment training utterance not paired with any corresponding target speaker embedding.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
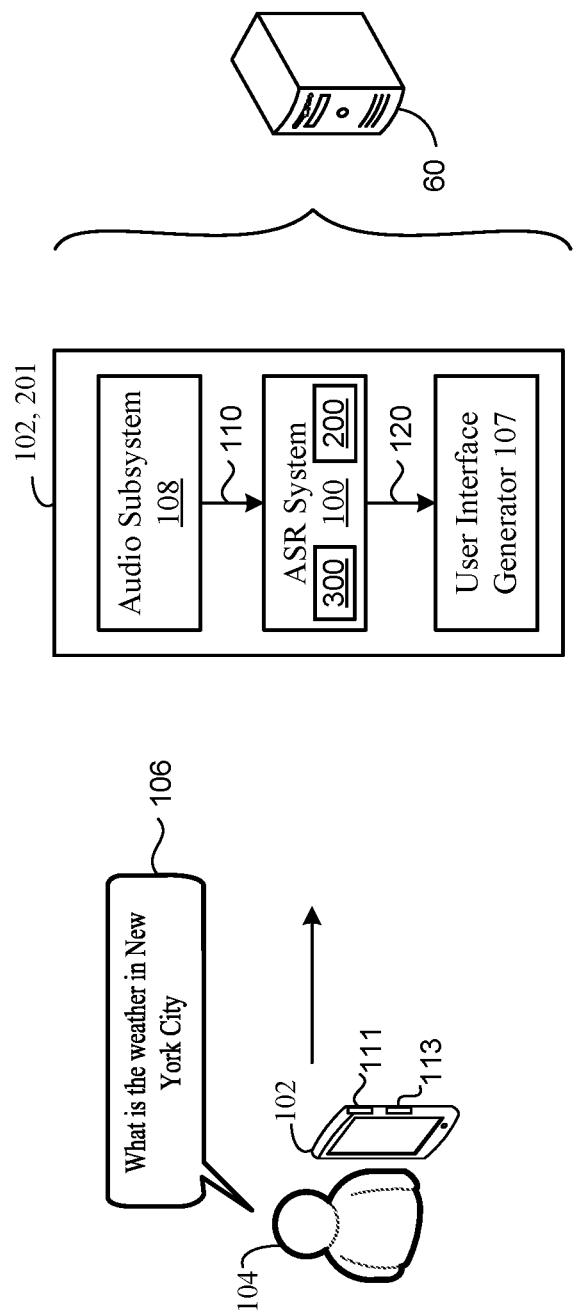
FIG. 1 is a schematic view of an example speech recognition system including a speech recognition model.

Many speech recognition systems include a voice activity detector (VAD) that resides upstream of other components in the speech recognition systems such as automated speech recognition (ASR) models and speaker identification models. Here, the VAD acts as a gating component that discards acoustic frames including non-speech data (e.g., television noise or other background noise) and forwards acoustic frames including speech data to the downstream components of the speech recognition system. As such, the VAD improves the performance of downstream components and reduces the overall computational cost and size of the speech recognition system by preventing more computationally expensive downstream components (e.g., ASR models) from processing acoustic frames that do not include any non-speech data.

Recently, VADs have been personalized for a target user (or multiple target users) such that the personalized VAD discards any acoustic frames that do not include speech spoken by the target user. That is, while conventional VADs simply determine whether input audio includes non-speech or speech (e.g., speech spoken by any user) the personalized VAD determines whether input audio includes non-speech, speech spoken by a target user (or one of multiple target users), or speech spoken by a non-target user. Here, the downstream components of the speech recognition systems only process the acoustic frames spoken by the target user.

However, current personalized VADs have several critical drawbacks preventing the personalized VADs from being used in production speech recognition systems. For instance, current personalized VADs determine whether input audio data includes non-speech, speech by a target user, or speech by a non-target user by concatenating input audio data with a speaker embedding. Importantly, acoustic features and speaker embeddings represent very different information and are extracted through entirely separate processes thereby leading to different distributions and magnitudes. Thus, simply concatenating the input audio data with the speaker embedding significantly limits the capacity of these personalized VADs. As a result of this concatenation approach, the word error rate (WER) of the speech recognition systems degrade such that the personalized VADs are not suitable for production speech recognition systems.

Another critical drawback of current personalized VADs is the assumption that at least one target speaker is enrolled. Enrolling a target speaker includes prompting the target speaker to speak enrollment utterances to encode voice characteristics of the target user and generate the speaker embedding (i.e., enrollment scenario). However, the enrollment process is optional and oftentimes users skip the enrollment process such that there are zero enrolled target speakers for a particular device (i.e., enrollment-less scenario). Consequently, assuming that there is at least one target speaker during training of the personalized VADs has adverse results of the speech recognition systems in a production environment where there are zero enrolled target speakers.

Accordingly, implementations herein are directed towards a personal VAD optimized for speech recognition. In some implementations, the personal VAD includes a stack of multi-headed self-attention blocks, a feature-wise linear modulation (FiLM) generator, a FiLM layer, and a classifier. The stack of multi-headed self-attention blocks is configured to generate a reference speaker embedding for an utterance and the FiLM generator is configured to generate FiLM parameters based on a target speaker embedding for a target speaker. Thereafter, the FiLM layer is configured to generate an affine transformation that scales and shifts the reference speaker embedding based on the FiLM parameters and the classifier is configured to determine whether the utterance was spoken by the target speaker based on the affine transformation output.

In other implementations, the personal VAD also includes a speaker pre-net configured to generate a speaker information embedding extracted from the utterance and determine a cosine similarity between the target speaker embedding and the speaker information embedding. Here, the FiLM generator generates the FiLM parameters based on the cosine similarity (rather than based directly on the target speaker embedding). The personal VAD discards any acoustic frames the not spoken by the target speaker and sends acoustic frames spoken by the target speaker to downstream components for further processing. Notably, the personal VAD operates in a streaming fashion by producing a frame-wise decision for each acoustic frame in a sequence of acoustic frames of the utterance indicating whether a corresponding acoustic frame was spoken by the target speaker. As will become apparent, the personal VAD trains using training data that includes training utterances paired with target speaker embeddings and training utterances not paired with any target speaker embeddings. Training the personal VAD in this manner allows the speech recognition systems to maintain optimal performance of WER and latency in both the enrollment and enrollment-less scenarios.

FIG. 1 illustrates an automated speech recognition (ASR) system 100 implementing a neural network model (e.g., ASR model) 200 and a personal voice activity detector (VAD) 300 each residing on a user device 102 of a user 104 and/or on a remote computing device 60 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with a sequence of acoustic frames 110 capable of being processed by the ASR system 100. In the example shown, the user speaks a respective utterance 106 in a natural language of English for the phrase "What is the weather in New York City?" and the audio subsystem 108 converts the utterance 106 into a corresponding sequence of acoustic frames 110 for input to the ASR system 100.

The personal VAD 300 receives, as input, the sequence of acoustic frames 110 corresponding to the utterance 106 and generates a classification output indicating whether the utterance 106 was spoken by the target speaker. In some examples, the personal VAD 300 discards acoustic frames 110 that include non-speech or speech not spoken by the target speaker. Here, the personal VAD 300 only sends acoustic frames 110 that includes speech spoken by the target speaker to the ASR model 200 for further processing (e.g., in the enrollment scenario with at least one target speaker). In other examples, the personal VAD 300 discards acoustic frames 110 only when the acoustic frames 110 include non-speech and sends the acoustic frames 110 that include speech by any user to the ASR model 200 for further processing (e.g., in the enrollment-less scenario with zero target speakers). Notably, the personal VAD 300 may permit the target speaker to speak utterances directed toward the ASR system 100 without having to speak an invocation phrase (e.g., a hotword/wakeword) to wake-up the ASR model 200 to commence processing the input audio data to transcribe the utterance. In some instances, the user device 102 may operate in a low-power state when the personal VAD 300 classifies input acoustic frames 110 as speech spoken by the target speaker, thereby causing the user device 102 to wake from the low-power state and invoke the speech recognition model 200 to perform speech recognition on the input acoustic frames 110.

Thereafter, the ASR model 200 receives, as input, the sequence of acoustic frames 110 corresponding to the utterance 106, and generates/predicts, as output, a corresponding transcription 120 (e.g., recognition result/hypothesis) of the utterance 106. In the example shown, the user device 102 and/or the remote computing device 60 also executes a user interface generator 107 configured to present a representation of the transcription 120 (e.g., recognition result/hypothesis) of the utterance 106. In the example shown, the user device 102 and/or the remote computing device 60 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 remote computing device 60, to execute a user command. Additionally or alternatively, a text-to-speech model (e.g., executing on any combination of the user device 102 or the remote computing device 60) may convert the transcription 120 into synthesized speech for audible output by another device. For instance, the original utterance 106 is sending to a friend in which the transcription 120 is converted to synthesized speech for audible output to the friend to listen to the message conveyed in the original utterance 106.

Figure 2:
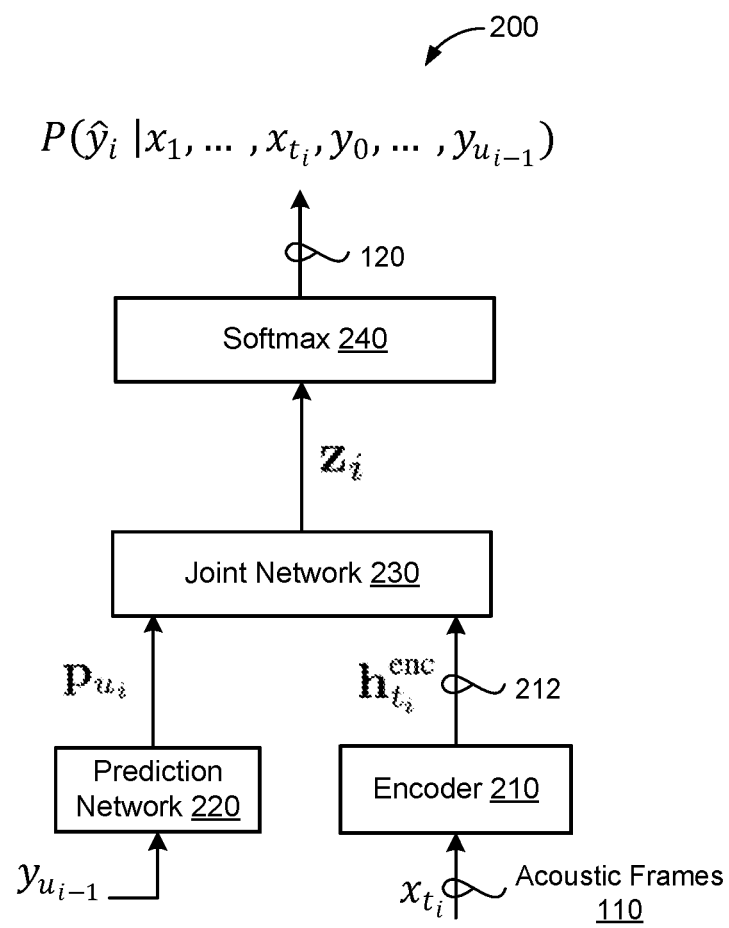
FIG. 2 is a schematic view of an example speech recognition model including a Recurrent Neural Network-Transducer (RNN-T) model architecture.

Referring to FIG. 2, an example ASR model 200 may include a Recurrent Neural Network-Transducer (RNN-T) model architecture which adheres to latency constraints associated with interactive applications. The use of the RNN-T model architecture is exemplary only, and the ASR model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance, the encoder network (e.g., encoder) 210 reads a sequence of d-dimensional feature vectors (e.g., sequence of acoustic frames 110 (FIG. 1))x= $(x_1, x_2, \ldots, x_T)$, where $x_t \in \mathbb{R}^d$, and produces, at each of a plurality of output steps, a higher-order feature representation 212. This higher-order feature representation 212 may also be denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network 230 then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make any conditional independent assumptions, rather the prediction of each symbol is conditioned not only on the acoustic frames but also on the sequence of labels output so far. As such, the Softmax layer 240 may select the speech recognition hypothesis having a highest corresponding probability from the probability distribution as the transcription 120. The RNN-T model 200 does assume an output symbol is independent of future acoustic frames 110, which allows the RNN-T model 200 to be employed in a streaming fashion.

In some examples, the encoder 210 of the RNN-T model includes a plurality of multi-head (e.g., 8 heads) self-attention layers. For example, the plurality of multi-head self-attention layers may include Conformer layers (e.g., Conformer-encoder), transformer layers, performer layers, convolution layers (including lightweight convolution layers), or any other type of multi-head self-attention layers. The plurality of multi-head self-attention layers may include any number of layers, for instance 16 layers. Moreover, the encoder 210 may operate in a streaming fashion (e.g., the encoder 210 outputs the higher-order feature representations 212 as soon as they are generated) or in a non-streaming fashion whereby the encoder 210 processes additional right-context to improve upon the speech recognition results.

Figure 3A:
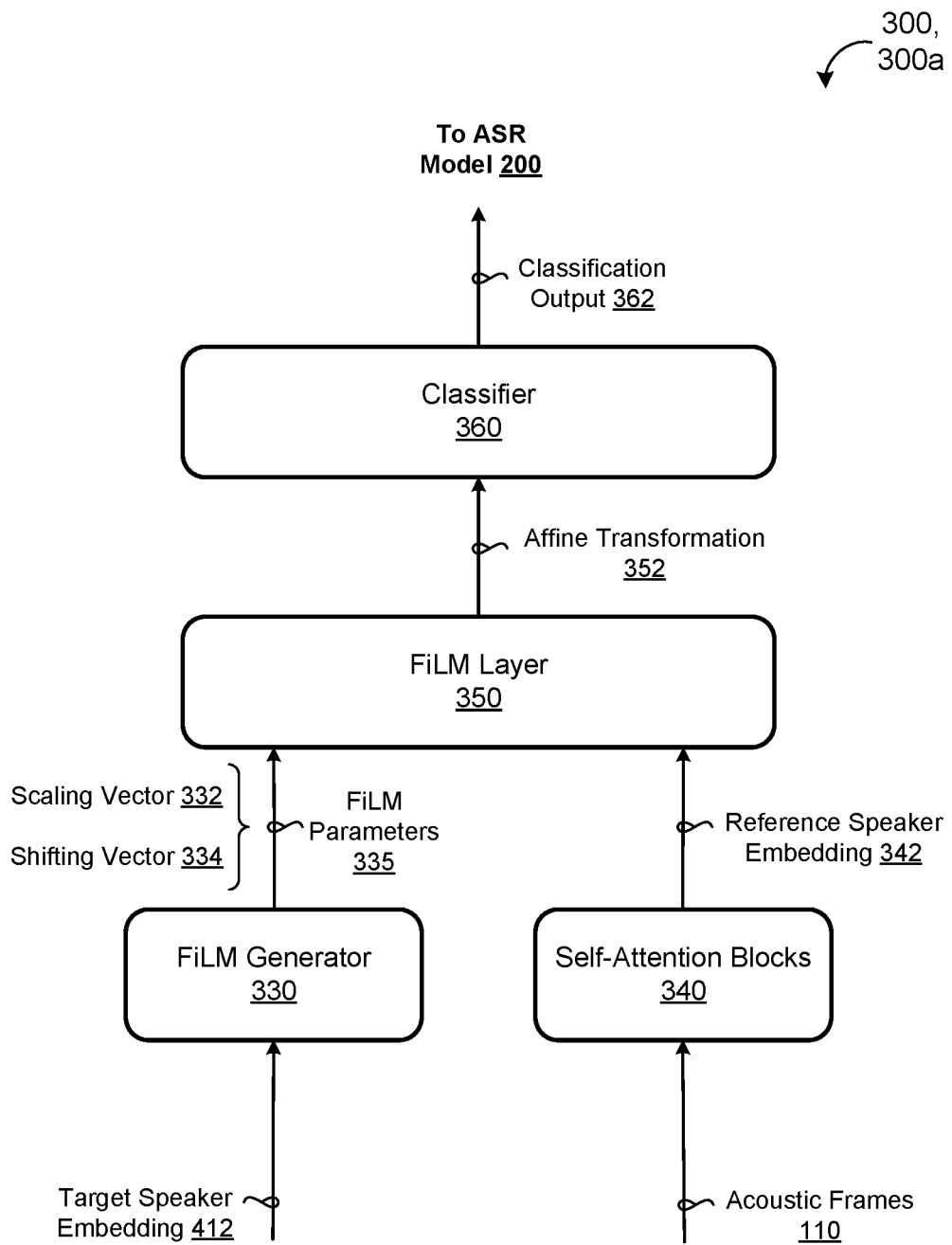
FIGS. 3A and 3B are schematic views of exemplary personal voice activity detectors.
Figure 3B:
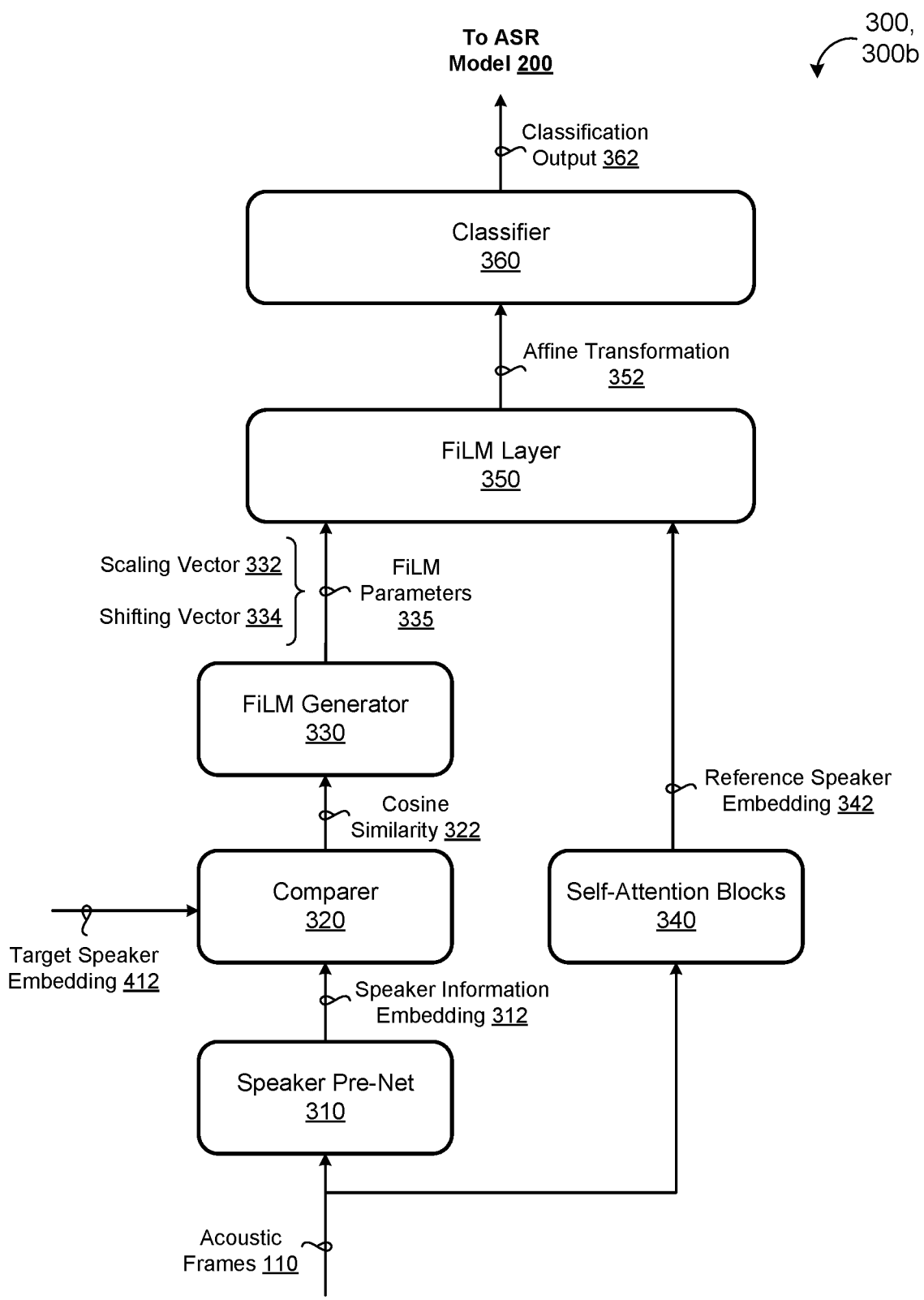

FIGS. 3A and 3B illustrate exemplary personal VADs 300. The personal VAD 300 acts as a gating component of the ASR system 100 discarding acoustic frames 110 that do not include speech spoken by a target speaker. On the other hand, the personal VAD sends acoustic frames 110 including speech spoken by the target speaker to the ASR model 200 (FIG. 2) for further processing. Notably, in some scenarios, the personal VAD 300 operates as a non-personalized VAD and sends acoustic frames 110 including speech spoken by any user (e.g., whether spoken by the target speaker or another speaker) to the ASR model 200 (FIG. 2) for further processing. For example, in the enrollment-less scenario (e.g., no target speakers are enrolled) the personal VAD 300 may still send the acoustic frames 110 including speech for further processing and discard acoustic frames 110 including non-speech.

FIG. 3A illustrates an example personal VAD 300, 300a that includes a FiLM generator 330, a stack of multi-headed self-attention blocks 340, a FiLM layer 350, and a classifier 360. The stack of multi-headed self-attention blocks 340 (also referred to as simply "stack of self-attention blocks 340") includes one or more Conformer layers (e.g., four (4) Conformer layers). Here, each Conformer layer includes a 64-dimensional Conformer layer, a multi-headed (e.g., 8 heads) attention mechanism, a causal 7×7 convolution kernel, and 31 frames of left-context. In other examples, each self-attention block 340 in the stack of self-attention blocks 340 includes one or more other self-attention layers, for example, transformer layers, performer layers, or convolution layers.

The stack of self-attention blocks 340 is configured to receive, as input, a sequence of acoustic frames (x) 110 corresponding to an utterance and generate, at each of the plurality of output steps, a reference speaker embedding (h) 342 for a corresponding acoustic frame 110 in the sequence of acoustic frames 110 of the utterance. For example, when the stack of self-attention blocks includes one or more Conformer layers, the reference speaker embedding is represented by h=Conformer (x). The stack of self-attention blocks 340 output the reference speaker embedding generated at each output step to the FiLM layer 350.

The FiLM generator 330 is configured to receive, as input, a target speaker embedding ($e^{target}$) 412 for a target speaker and generate, as output, FiLM parameters 335 based on the target speaker embedding 412. Here, the FiLM parameters 335 include a scaling vector ($\gamma(e^{target})$) 332 and a shifting vector ($\beta(e^{target})$) 334 (collectively referred to as the FiLM parameters 335). As will become apparent, the FiLM layer 350 uses the FiLM parameters 335 to modulate the reference speaker embedding 342. Stated differently, the FiLM generator 330 generates the FiLM parameters 335 based on an external conditioning input (e.g., the target speaker embedding 412). The FiLM generator 330 outputs the scaling vector 332 and the shifting vector 334) to the FiLM layer 350.

The FiLM layer is configured to receive, as input, the reference speaker embedding 342 generated by the stack of self-attention blocks 340 at each of the plurality of output steps and the FiLM parameters 335 generated by the FiLM generator 330 and generate, at each of the plurality of output steps, an affine transformation output 352. The FiLM layer 350 generates the affine transformation output 352 by applying a feature-wise affine transformation (e.g., FiLM operation) to the reference speaker embedding 342 using the FiLM parameters 335 (e.g., the scaling vector 332 and the shifting vector 334). Notably, the feature-wise affine transformation generalizes concatenation-based, biasing-based, and scaling-based conditioning operators which is more expressive in learning conditional representations than using any one individually.

In some implementations, the FiLM layer 350 applies a different affine transformation to each feature of the reference speaker embedding 342. In other implementations, the FiLM layer 350 applies a different affine transformation to each channel consistent across spatial locations (e.g., in a convolutional network configuration). For example, in these implementations, the FiLM layer 350 first scales each feature (or channel) of the reference speaker embedding 342 using the scaling vector ($\gamma(e^{target})$) 332 and then shifts each feature (or channel) of the reference speaker embedding 342 using the shifting vector ($\beta(e^{target})$) 334. In particular, the FiLM layer 350 may generate the affine transformation output 352 according to:

$$FiLM(h) = \gamma(e^{target}) * h + \beta(e^{target}) \quad (1)$$

In Equation 1, FiLM(h) represents the affine transformation output 352, $\gamma(e^{target})$ represents the scaling vector 332, $\beta(e^{target})$ represents the shifting vector 334, and h represents the reference speaker embedding 342.

In some implementations, the classifier 360 includes a fully-connected layer. The classifier 360 is configured to receive, as input, the affine transformation output 352 generated by the FiLM layer 350 at each of the plurality of output steps and generate a classification output 362 indicating whether the utterance was spoken by the target speaker based on the affine transformation output 352. The classification output 362 may include at least one of a target speaker token (tst) indicating the utterance was spoken by the target speaker, a non-target speaker token (ntst) indicating the utterance was spoken by another speaker (e.g., non-target speaker), or a non-speech token (nst) indicating the utterance was non-speech. For instance, the non-speech may include audio data representing audio data captured from a television or radio.

FIG. 3B illustrates an example personal VAD 300, 300b that a speaker pre-net 310, a comparer 320, the FiLM generator 330, the stack of self-attention blocks 340, the FiLM layer 350, and the classifier 360. That is, instead of directly conditioning the target speaker embeddings 412 to the FiLM generator 330, the speaker pre-net 310 extracts a speaker information embedding 312 from the acoustic frames 110. The speaker information embedding 312 includes the same dimensions as the target speaker embedding 412. Advantageously, using the speaker information embeddings 312 provides more discriminative information for the personal VAD 300 thereby allowing the classifier 360 to better determine whether acoustic frames 110 were spoken by the target speaker.

In particular, the speaker pre-net 310 is configured to receive the sequence of acoustic frames (x) 110 and generate, at each of a plurality of output steps, a speaker information embedding 312 for a corresponding acoustic frame 110 in the sequence of acoustic frames 110. That is, the speaker pre-net 310 extracts the speaker information embeddings 312 from the sequence of acoustic frames 110. The speaker pre-net 310 may generate the speaker information embeddings 312 according to:

$$e^{prenet} = \text{PreNet}(x) \quad (2)$$

In Equation 2, $e^{prenet}$ represents the speaker information embeddings 312 and x represents the sequence of acoustic frames 110. Each speaker information embedding 312 includes a fixed-length embedding for a corresponding acoustic frame 110 represented by:

$$e^{prenet} \in \mathbb{R}^{T \times D_e} \quad (3)$$

In Equation 3, $e^{prenet}$ represents the speaker information embeddings 312 and De represents the dimension of the speaker information embedding 312 (e.g., which is equal to the dimension of the target speaker embedding 412).

The comparer 320 receives, as input, the speaker information embedding 312 generated by the speaker pre-net 310 at each of the plurality of output steps and the target speaker embedding 412 and generates, as output, a cosine similarity score 322. In particular, the comparer 320 determines cosine similarity scores ($s \in \mathbb{R}^T$) 322 between the speaker information embedding 312 and the target speaker embedding 412. The comparer 320 may generate the cosine similarity scores represented by:

$$s = \cos(e^{prenet}, e^{target}) \quad (4)$$

The FiLM generator 330 is configured to receive, as input, the cosine similarity scores (s) 322 and generate, as output, the FiLM parameters 335 based on the cosine similarity scores 322. Here, the FiLM parameters 335 include the scaling vector ($\gamma(s)$) 332 and a shifting vector ($\beta(s)$) 334 (collectively referred to as the FiLM parameters 335). The FiLM layer 350 uses the FiLM parameters 335 to modulate the reference speaker embedding 342. The FiLM generator 330 outputs the scaling vector 332 and the shifting vector 334) to the FiLM layer 350.

The stack of self-attention blocks 340 is configured to receive, as input, a sequence of acoustic frames (x) 110 corresponding to an utterance and generate, at each of the plurality of output steps, a reference speaker embedding (h) 342 for a corresponding acoustic frame 110 in the sequence of acoustic frames 110 of the utterance. For example, when the stack of self-attention blocks includes one or more Conformer layers, the reference speaker embedding is represented by h=Conformer (x). The stack of self-attention blocks 340 output the reference speaker embedding generated at each output step to the FiLM layer 350.

The FiLM layer is configured to receive, as input, the reference speaker embedding 342 generated by the stack of self-attention blocks 340 at each of the plurality of output steps and the FiLM parameters 335 generated by the FiLM generator 330 and generate, at each of the plurality of output steps, an affine transformation output 352. The FiLM layer 350 generates the affine transformation output 352 by applying a feature-wise affine transformation (e.g., FiLM operation) to the reference speaker embedding 342 using the FiLM parameters 335 (e.g., the scaling vector 332 and the shifting vector 334).

In some implementations, the FiLM layer 350 applies a different affine transformation to each feature of the reference speaker embedding 342. In other implementations, the FiLM layer 350 applies a different affine transformation to each channel consistent across spatial locations (e.g., in a convolutional network configuration). For example, in these implementations, the FiLM layer 350 first scales each feature (or channel) of the reference speaker embedding 342 using the scaling vector ($\gamma(e^{target})$) 332 and then shifts each feature (or channel) of the reference speaker embedding 342 using the shifting vector ($\beta(e^{target})$) 334. In particular, the FiLM layer 350 may generate the affine transformation output 352 according to:

$$FiLM(h) = \gamma(s)*x + \beta(s) \quad (5)$$

In Equation 1, FiLM(h) represents the affine transformation output 352, $\gamma(e^{target})$ represents the scaling vector 332, $\beta(e^{target})$ represents the shifting vector 334, and h represents the reference speaker embedding 342.

In some implementations, the classifier 360 includes a fully-connected layer. The classifier 360 is configured to receive, as input, the affine transformation output 352 generated by the FiLM layer 350 at each of the plurality of output steps and generate a classification output 362 indicating whether the utterance was spoken by the target speaker based on the affine transformation output 352. The classification output 362 may include at least one of a target speaker token (tss) indicating the utterance was spoken by the target speaker, a non-target speaker token (ntss) indicating the utterance was spoken by a different speaker (e.g., non-target speaker) than the target speaker, or a non-speech token (ns) indicating the utterance was non-speech. For instance, the non-speech may include audio data representing audio data captured from a television or radio.

Referring again to both FIGS. 3A and 3B, in the enrollment scenario, the personal VAD 300 may send acoustic frames 110 to the ASR model 200 (FIG. 2) for further processing only when personal VAD 300 generates a classification output 362 indicating the target speaker token for a corresponding acoustic frame 110 and discard acoustic frames 110 corresponding to non-target speaker tokens or non-speech tokens. On the other hand in the enrollment-less scenario, the example personal VAD 300a may send acoustic frames 110 to the ASR model 200 (FIG. 2) for further processing only when personal VAD 300 generates a classification output 362 indicating either the target speaker token or a non-target speaker token for a corresponding acoustic frame 110 and discard acoustic frames 110 corresponding to non-speech tokens. Notably, the personal VAD 300 operates in a streaming fashion such that the personal VAD outputs, each of the plurality of output steps, a classification output 362 for a corresponding acoustic frame 110 in the sequence of acoustic frames 110. Thus, the personal VAD 300 can seamlessly be integrated in an ASR system including a streaming ASR model by adding minimal (or zero) additional latency.

Figure 4:
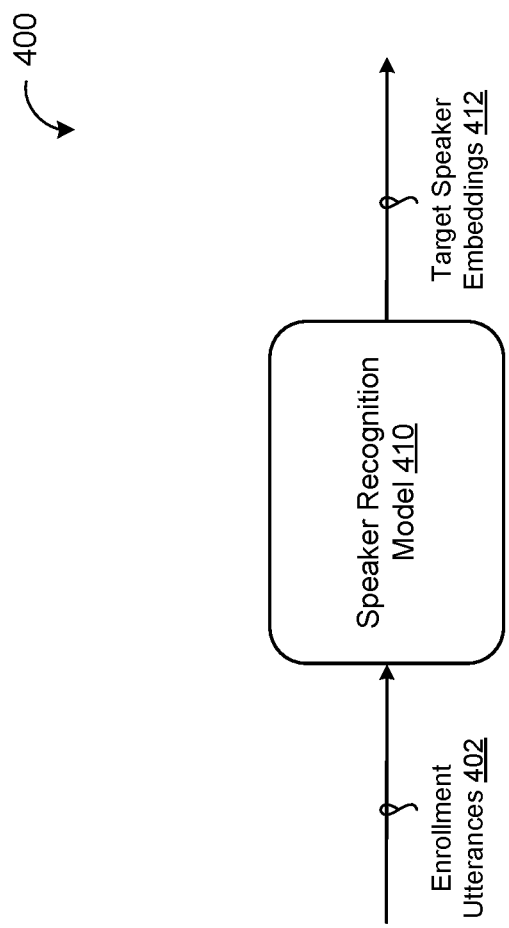
FIG. 4 is a schematic view of a target speaker enrollment process.

FIG. 4 illustrates a target speaker enrollment process 400 configured to generate target speaker embeddings 412 for target speakers. That is, to determine whether an utterance was spoken by a target speaker or not the personal VAD requires a target speaker embedding 412 representing voice characteristics of the target speaker. Thus, a user device 102 (FIG. 1) may prompt the user 104 to speak one or more enrollment utterances 402 to encode voice characteristics of the user 104. The target speaker enrollment process 400 includes a pre-trained text-independent speaker recognition model 410 (also referred to as simply "speaker recognition model 410") that receives the enrollment utterances 402 and generates a target speaker embedding 412 for the corresponding user 104.

The target speaker enrollment process 400 may pair the generated target speaker embedding 412 with the user thereby making the user a target speaker. The target speaker embedding 412 may be stored at the memory hardware 113 of the user device 102 (FIG. 1). Although the implementations described above only consider a single target speaker, the target speaker enrollment process 400 may generate a corresponding target speaker embedding 412 for each target speaker of multiple target speakers. For instance, each target speaker may correspond to a respective enrolled user among multiple enrolled users that share a speech-enabled device.

In some examples, users opt out of the target speaker enrollment process 400 such that there are zero target speakers. Accordingly, the personal VAD 300 trains using training data that includes utterances spoken by target speakers with a corresponding target speaker embedding 412 and utterances spoken by non-target speakers (e.g., non-enrolled speakers) without any corresponding target speaker embeddings 412. In particular, the training process generates the training data by sampling a subset of training utterances that include target speaker embeddings 412 and ground-truth labels of non-target speaker tokens and set the target speaker embedding to zero and replace the non-target speaker token with a target speaker token. Advantageously, generating the training data in this manner allows speech recognition systems to maintain performance (e.g., WER) in enrollment and enrollment-less scenarios.

Figure 5:
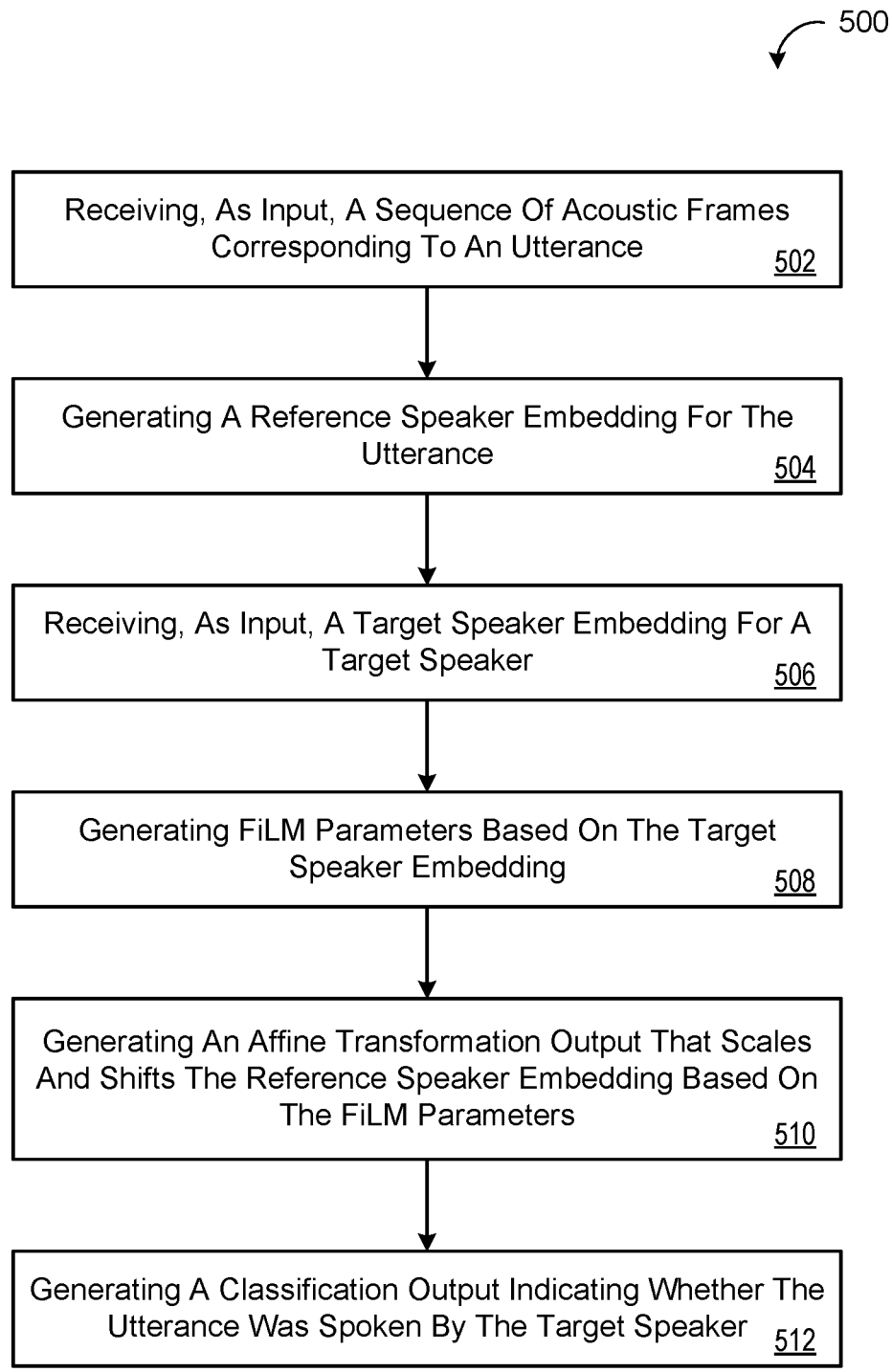
FIG. 5 is a flowchart of an example arrangement of operations for a method of optimizing a personal voice activity detector using the example personal voice activity detector of FIG. 3A.
Figure 7:
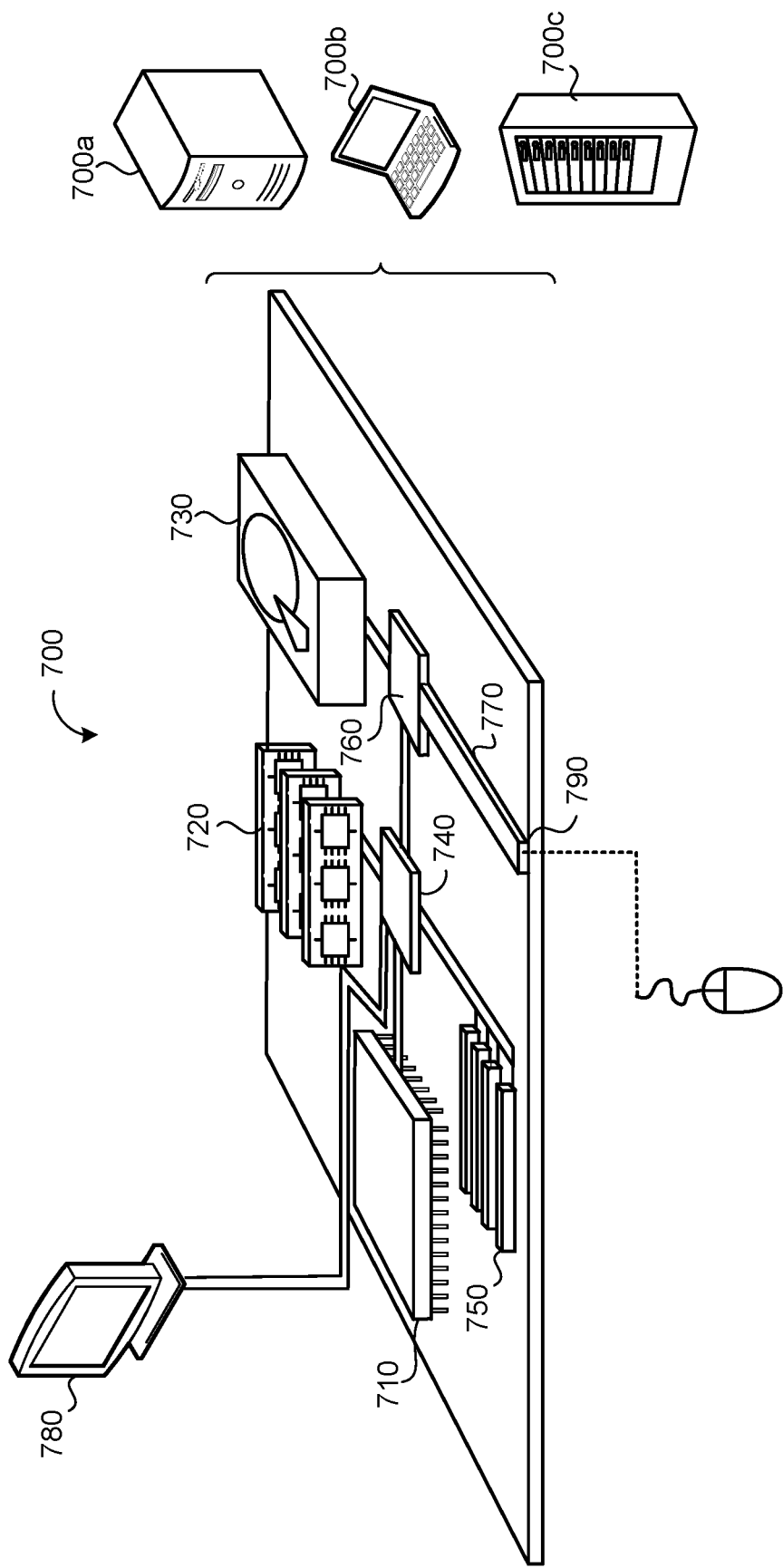
FIG. 7 is a schematic view of an example computing device that may be used to implement the systems and methods described herein.

FIG. 5 is flowchart of an example arrangement of operations for a method 500 of optimizing a personal voice activity detector. The method 500 may execute on data processing hardware 710 (FIG. 7) using instructions stored on memory hardware 720 (FIG. 7). The data processing hardware 710 and the memory hardware 720 may reside on the user device 102 and/or the remote computing device 60 of FIG. 1 corresponding to a computing device 700 (FIG. 7).

At operation 502, the method 500 includes receiving a sequence of acoustic frames 110 corresponding to an utterance as input to a personal VAD 300. At operation 504, the method 500 includes generating a reference speaker embedding 342 for the utterance using a stack of multi-headed self-attention blocks 340. At operation 506, the method 500 includes receiving as input to a FiLM generator 330 a target speaker embedding 412 for a target speaker and, at operation 508, generating FiLM parameters 335 including a scaling vector 332 and a shifting vector 334 based on the target speaker embedding 412 using the FiLM generator 330. At operation 510, the method 500 includes generating, using a FiLM layer 350, an affine transformation output 352 that scales and shifts the reference speaker embedding 342 based on the FiLM parameters 335. At operation 512, the method 500 includes generating a classification output 362 indicating whether the utterance (or corresponding acoustic frame 110) was spoken by the target speaker based on the affine transformation output 352.

Figure 6:
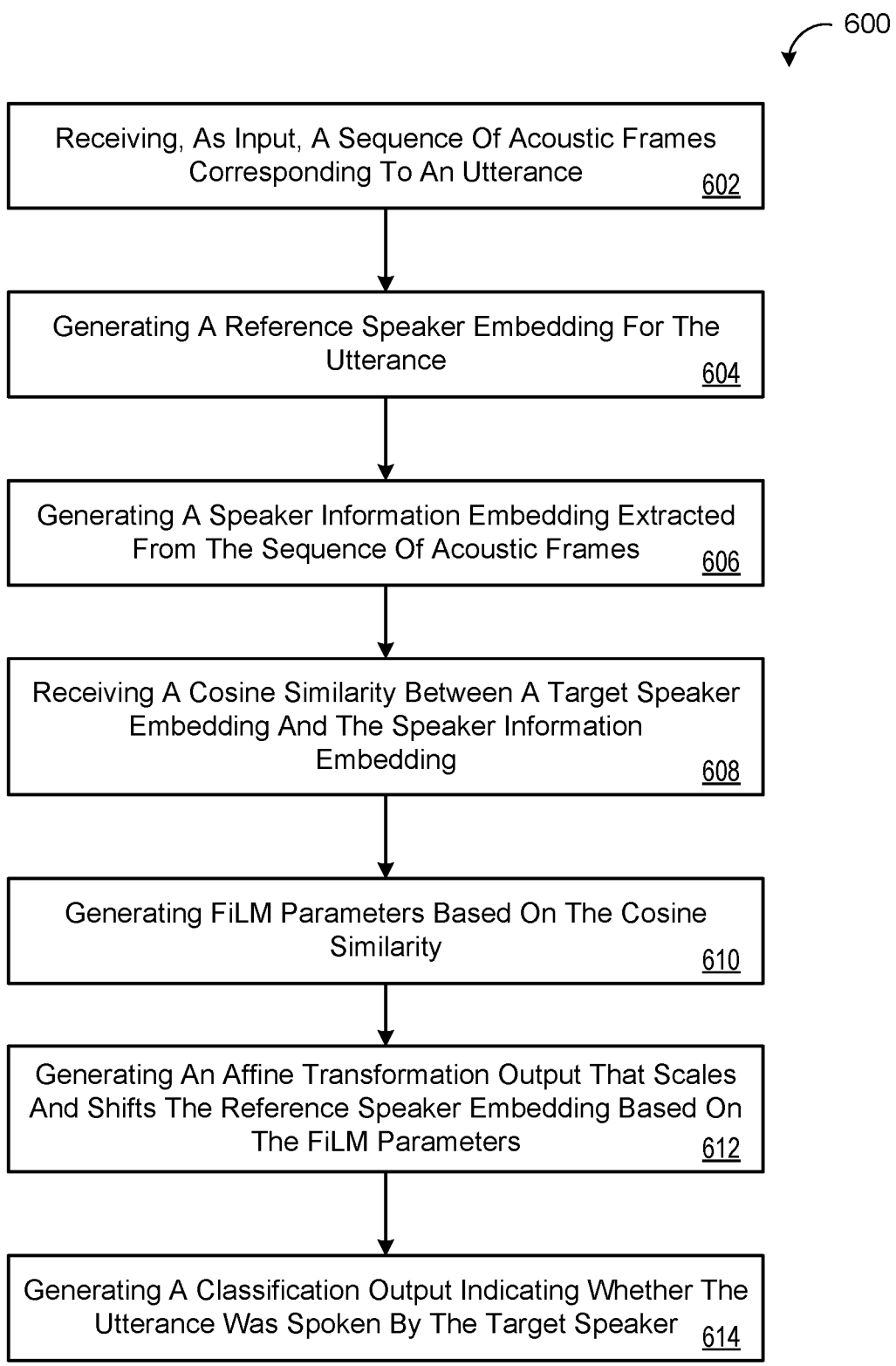
FIG. 6 is a flowchart of an example arrangement of operations for a method of optimizing a personal voice activity detector using the example personal voice activity detector of FIG. 3B.

FIG. 6 is flowchart of an example arrangement of operations for a method 600 of optimizing a personal voice activity detector. The method 600 may execute on the data processing hardware 710 (FIG. 7) using instructions stored on the memory hardware 720 (FIG. 7). The data processing hardware 710 and the memory hardware 720 may reside on the user device 102 and/or the remote computing device 60 of FIG. 1 corresponding to the computing device 700 (FIG. 7).

At operation 602, the method 600 includes receiving a sequence of acoustic frames 110 corresponding to an utterance as input to a personal VAD 300. At operation 604, the method 600 includes generating a reference speaker embedding 342 using a stack of multi-headed self-attention blocks 340. At operation 606, the method 600 includes generating, using a speaker pre-net 310, a speaker information embedding 312 extracted from the sequence of acoustic frames 110. At operation 608, the method 600 includes receiving, as input to a FiLM generator 330, a cosine similarity 322 between a target speaker embedding 412 and the speaker information embedding 312 and, at operation 610, generating FiLM parameters 335 including a scaling vector 332 and a shifting vector 334 based on the cosine similarity 322. That is, the FiLM generator 330 generates the FiLM parameters 335 based on the cosine similarity 322 instead of the based on the target speaker embedding 412 (FIG. 5)). At operation 612, the method 600 includes generating an affine transformation output 352 that scales (e.g., by the scaling vector 332) and shifts (e.g., by the shifting vector 334) the reference speaker embedding based on the FiLM parameters 335. At operation 614, the method 600 includes generating a classification output 362 indicating whether the utterance was spoken by the target speaker based on the affine transformation output 352.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A personal voice activity detector (VAD) for execution by data processing hardware, the VAD comprising:
   a stack of multi-headed self-attention blocks configured to cause the data processing hardware to:
      receive, as input, a sequence of acoustic frames corresponding to an utterance; and
      generate, as output, a reference speaker embedding for the utterance;
   a feature-wise linear modulation (FILM) generator configured to cause the data processing hardware to:
      receive, as input, a target speaker embedding for a target speaker; and
      generate, as output, FiLM parameters comprising a scaling vector and a shifting vector based on the target speaker embedding;
   a FiLM layer configured to cause the data processing hardware to:
      receive, as input, the reference speaker embedding and the FILM parameters; and
      generate, as output, an affine transformation output that scales and shifts the reference speaker embedding based on the FILM parameters; and
   a classifier configured to cause the data processing hardware to generate a classification output indicating whether the utterance was spoken by the target speaker based on the affine transformation output.

2. The personal VAD of claim 1, wherein the classification output comprises at least one of:
   a target speaker token;
   a non-target speaker token; or
   a non-speech token.

3. The personal VAD of claim 1, further comprising a speaker pre-net configured to cause the data processing hardware to:
   receive, as input, the sequence of acoustic frames; and
   generate, as output, a speaker information embedding extracted from the sequence of acoustic frames.

4. The personal VAD of claim 3, wherein the FILM generator is further configured to cause the data processing hardware to:
   receive, as input, a cosine similarity between the target speaker embedding and the speaker information embedding; and
   generate, as output, the FILM parameters comprising the scaling vector and the shifting vector based on the cosine similarity.

5. The personal VAD of claim 3, wherein the speaker pre-net comprises a stack of multi-headed self-attention layers comprising one or more Conformer layers.

6. The personal VAD of claim 1, wherein the stack of multi-headed self-attention blocks comprises one or more Conformer layers.

7. The personal VAD of claim 1, wherein the classifier comprises a fully-connected layer.

8. The personal VAD of claim 1, wherein the personal VAD operates in a streaming fashion.

9. The personal VAD of claim 1, further comprising a pre-trained text-independent speaker recognition model configured to cause the data processing hardware to:
   receive, as input, enrollment utterances spoken by the target speaker; and
   generate, as output, the target speaker embedding for the target speaker based on the enrollment utterances.

10. The personal VAD of claim 1, wherein the personal VAD is trained on training data comprising:
    an enrollment training utterance paired with the target speaker embedding; and
    a non-enrollment training utterance not paired with any corresponding target speaker embedding.

11. A computer-implemented method when executed by data processing hardware causes the data processing hardware to perform operations comprising:
    receiving, as input to a personal voice activity detector (VAD), a sequence of acoustic frames corresponding to an utterance;
    generating, using a stack of multi-headed self-attention blocks of the personal VAD, a reference speaker embedding for the utterance;
    receiving, as input to a feature-wise linear modulation (FILM) generator of the personal VAD, a target speaker embedding for a target speaker;
    generating, using the FILM generator, FiLM parameters comprising a scaling vector and a shifting vector based on the target speaker embedding;
    generating, using a FILM layer of the personal VAD, an affine transformation output that scales and shifts the reference speaker embedding based on the FILM parameters; and
    generating, using a classifier of the personal VAD, a classification output indicating whether the utterance was spoken by the target speaker based on the affine transformation output.

12. The computer-implemented method of claim 11, wherein the classification output comprises at least one of:
    a target speaker token;
    a non-target speaker token; or
    a non-speech token.

13. The computer-implemented method of claim 11, wherein the operations further comprise generating, using a speaker pre-net of the personal VAD, a speaker information embedding extracted from the sequence of acoustic frames.

14. The computer-implemented method of claim 13, wherein the operations further comprise generating, using the FILM generator, the FILM parameters based on a cosine similarity between the target speaker embedding and the speaker information embedding.

15. The computer-implemented method of claim 13, wherein the speaker pre-net comprises a stack of multi-headed self-attention layers comprising one or more Conformer layers.

16. The computer-implemented method of claim 11, wherein the stack of multi-headed self-attention blocks comprises one or more Conformer layers.

17. The computer-implemented method of claim 11, wherein the classifier comprises a fully-connected layer.

18. The computer-implemented method of claim 11, wherein the personal VAD operates in a streaming fashion.

19. The computer-implemented method of claim 11, wherein the operations further comprise:
    receiving, as input to a pre-trained text-independent speaker recognition model, enrollment utterances spoken by the target speaker; and generating, using the pre-trained text-independent speaker recognition model, the target speaker embedding for the target speaker based on the enrollment utterances.

20. The computer-implemented method of claim 11, wherein the personal VAD is trained on training data comprising:
   an enrollment training utterance paired with the target speaker embedding; and
   a non-enrollment training utterance not paired with any corresponding target speaker embedding.

* * * * *